(12) United States Patent
Marini et al.

(10) Patent No.: US 9,759,159 B2
(45) Date of Patent: Sep. 12, 2017

(54) INTEGRATED TURBINE EXHAUST STRUTS AND MIXER OF TURBOFAN ENGINE

(71) Applicant: PRATT & WHITNEY CANADA CORP., Longueuil (CA)

(72) Inventors: Remo Marini, Lasalle (CA); Mark Huzzard Cunningham, Montreal (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 243 days.

(21) Appl. No.: 14/521,888

(22) Filed: Oct. 23, 2014

(65) Prior Publication Data

US 2015/0337761 A1 Nov. 26, 2015

Related U.S. Application Data

(63) Continuation-in-part of application No. 14/287,125, filed on May 26, 2014.

(51) Int. Cl.
| | |
|---|---|
| *F02K 1/48* | (2006.01) |
| *F02K 1/38* | (2006.01) |
| *F01D 9/04* | (2006.01) |
| *F01D 25/30* | (2006.01) |

(52) U.S. Cl.
CPC .............. *F02K 1/386* (2013.01); *F01D 9/041* (2013.01); *F01D 25/30* (2013.01); *F02K 1/48* (2013.01); *F05D 2240/12* (2013.01); *F05D 2250/61* (2013.01)

(58) Field of Classification Search
CPC ... F02K 1/386; F02K 1/48; F02K 1/46; F05D 2250/61; F05D 2240/12; F01D 9/04; F01D 9/041

USPC ....................................................... 415/211.2
See application file for complete search history.

(56) References Cited

U.S. PATENT DOCUMENTS

| | | |
|---|---|---|
| 2,844,001 A | 7/1958 | Alford |
| 3,053,340 A | 9/1962 | Kutney |
| 3,092,205 A | 6/1963 | Brown et al. |
| 3,377,804 A | 4/1968 | Wright et al. |

(Continued)

FOREIGN PATENT DOCUMENTS

| | | |
|---|---|---|
| CA | 2704366 | 11/2010 |
| CH | 700083 | 12/2008 |

(Continued)

OTHER PUBLICATIONS

Extended European Search Report dated Mar. 16, 2016, issued on Applicant's corresponding European Patent Application 15190886.0-1607.

(Continued)

*Primary Examiner* — Gerald L Sung
*Assistant Examiner* — Thomas Burke
(74) *Attorney, Agent, or Firm* — Norton Rose Fulbright Canada

(57) ABSTRACT

A turbine exhaust case (TEC) of a turbofan aeroengine includes a mixer in an annular wavy configuration having alternate crests and valleys, and a plurality of radial deswirling struts interconnecting an annular hub positioned within the mixer and selected valleys of the mixer. A plurality of secondary trailing edge struts smaller than the deswirling struts in average chord dimensions interconnect the annular hub and other selected valleys free of connection with the deswirling struts.

17 Claims, 5 Drawing Sheets

(56) References Cited

U.S. PATENT DOCUMENTS

| | | | |
|---|---|---|---|
| 3,712,062 A | 1/1973 | Nash | |
| 4,045,957 A | 9/1977 | DiSabato | |
| 4,117,671 A * | 10/1978 | Neal | F02K 1/386 239/127.3 |
| 4,149,375 A | 4/1979 | Wynosky et al. | |
| 4,226,085 A | 10/1980 | Johnson | |
| 4,302,934 A | 12/1981 | Wynosky et al. | |
| 4,335,801 A | 6/1982 | Stachowiak et al. | |
| 4,819,425 A | 4/1989 | Farquhar et al. | |
| 6,412,283 B1 * | 7/2002 | Sheoran | F02K 1/386 60/770 |
| 6,606,854 B1 | 8/2003 | Siefker et al. | |
| 6,615,576 B2 | 9/2003 | Sheoran et al. | |
| 7,100,358 B2 | 9/2006 | Gekht et al. | |
| 8,635,875 B2 | 1/2014 | Cunningham | |
| 2004/0068981 A1 | 4/2004 | Siefker et al. | |
| 2004/0255573 A1 | 12/2004 | Rago | |
| 2006/0010852 A1 | 1/2006 | Gekht et al. | |
| 2008/0041033 A1 | 2/2008 | Durocher et al. | |
| 2010/0031631 A1 * | 2/2010 | Ramm | F01D 5/141 60/262 |
| 2011/0036068 A1 * | 2/2011 | Lefebvre | F01D 9/04 60/262 |
| 2011/0265447 A1 * | 11/2011 | Cunningham | F02K 1/48 60/264 |
| 2013/0115076 A1 * | 5/2013 | Bouchard | F01D 25/28 415/213.1 |

FOREIGN PATENT DOCUMENTS

| | | |
|---|---|---|
| DE | 101 45 489 A1 | 4/2003 |
| DE | 102007004741 A1 | 8/2008 |
| DE | 102010044483 | 3/2012 |
| EP | 2851516 | 3/2015 |
| GB | 2014665 A | 8/1979 |
| JP | 52-101312 | 8/1977 |
| JP | 3962978 | 10/2001 |

OTHER PUBLICATIONS

Extended European Search Report dated Jan. 26, 2015 issued on Applicant's corresponding European Patent Application No. 14185004.0-1607.

* cited by examiner

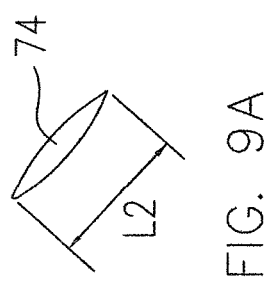
FIG. 9A
FIG. 9B
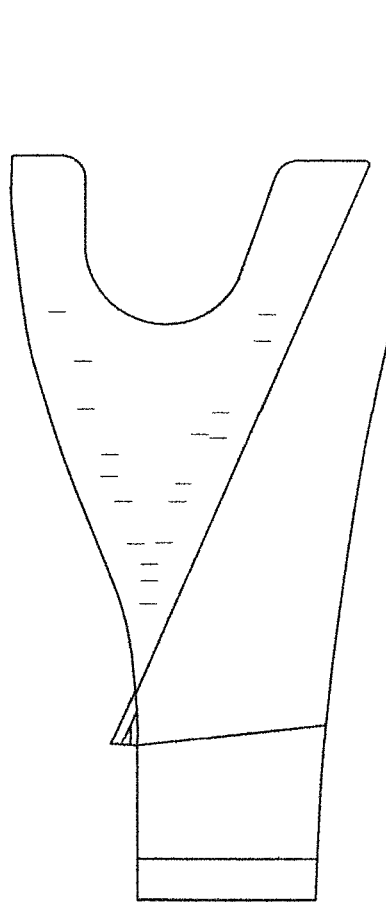
FIG. 10
PRIOR ART

INTEGRATED TURBINE EXHAUST STRUTS AND MIXER OF TURBOFAN ENGINE

CROSS-REFERENCE TO RELATED APPLICATIONS

The present application is a continuation-in-part of U.S. application Ser. No. 14/287,125, which claims priority on U.S. Provisional Application No. 61/879,723, filed on Sep. 19, 2013, and is incorporated herein by reference.

TECHNICAL FIELD

The application relates generally to turbofan aero-engines and, more particularly to an improved turbine exhaust case including a mixer for such engines.

BACKGROUND OF THE ART

In order to increase the effective thrust of turbojet engines, bladed fans have been added to a turbine driven shaft thereof to affect the flow of a quantity of atmospheric air through an annular bypass duct surrounding the turbojet. Hot gases exhausted from the engine core and the bypass airstream are mixed together before expulsion through a single nozzle. In order to perform the mixing function, mixers have been attached to the downstream end of a shroud of the turbine exhaust case (TEC). A swirling flow of exhaust gases from the turbine exit is conventionally deswirled by a plurality of deswirling struts located within the TEC, upstream of the mixer as shown in FIG. 10, such that the exhausted gases are substantially deswirled prior to entering the mixer in order to maximize the performance of the struts and mixer individually and to promote efficient mixing with minimum pressure losses. Nevertheless, there is room for improvement of such a conventional configuration of deswirling struts and mixer.

Accordingly there is a need to provide an improved mixer.

SUMMARY

In one aspect, there is provided a turbine exhaust case (TEC) of a turbofan aeroengine comprising an annular hub and an annular shroud with a mixer attached to a downstream end of the shroud for mixing exhaust gases with a bypass air stream, the mixer including a plurality of axially extending lobes of the mixer arranged in alternating crests and valleys extending divergently in a downstream direction, the mixer surrounding the hub to form an annular exhaust gas duct between the mixer and the hub, a plurality of deswirling struts extending generally radially across the annular exhaust gas duct axially within the mixer to connect the mixer and the hub, the deswirling struts connected to the mixer via a selected first group of the valleys of the mixer, a plurality of secondary struts each having an average chord length shorter than an average chord length of the respective deswirling struts, the secondary struts generally radially extending across the annular gas duct to connect the mixer and the hub, the secondary struts connected to the mixer via a selected second group of the valleys distinct from the first group of valleys, the secondary struts connected to said second group of the valleys immediately upstream of a trailing edge of said valleys.

In another aspect, there is provided a turbofan aeroengine comprising a turbine exhaust case (TEC) positioned downstream of a turbine section of the turbofan aeroengine for directing a flow of gases exhausted from the turbine section, the TEC including an inner annular hub surrounded by an annular outer wall, a downstream end section of the annular outer wall being in a circumferential wavy configuration to form a plurality of axially extending lobes defining alternating crests and valleys extending divergently to a downstream end of the TEC, the crests defining internal axial and radially-outward passages for directing gases exiting from the turbine section to pass through the TEC, and the valleys defining external axial and radially-inward passages for directing a bypass air stream to pass along an external surface of the TEC, resulting in mixing of the gases with the bypass air stream, a number of circumferentially spaced deswirling struts each having a cambered profile and being located within an axial length of the wavy configuration, the deswirling struts radially interconnecting the annular hub and a first selected group of the valleys; a number of secondary struts each having an average chord length shorter than the average chord length of the respective deswirling struts, the secondary struts radially interconnecting the annular hub and a selected second group of the valleys free of connection of the deswirling struts and being located immediately upstream of a trailing edge of the selected second group of the valleys.

DESCRIPTION OF THE DRAWINGS

Reference is now made to the accompanying figures in which:

FIG. 9A is a cross-sectional view of the secondary strut of FIG. 6 having an airfoil profile;

FIG. 9B is a cross-sectional view of the secondary strut of FIG. 6 formed alternatively by a flat plate; and FIG. 10 is a partial cross-sectional view of a turbine exhaust case mixer conventionally attached to the turbine exhaust case downstream of deswirling struts installed within the turbine exhaust case.

It will be noted that throughout the appended drawings, like features are identified by like reference numerals.

DETAILED DESCRIPTION

Figure 1:
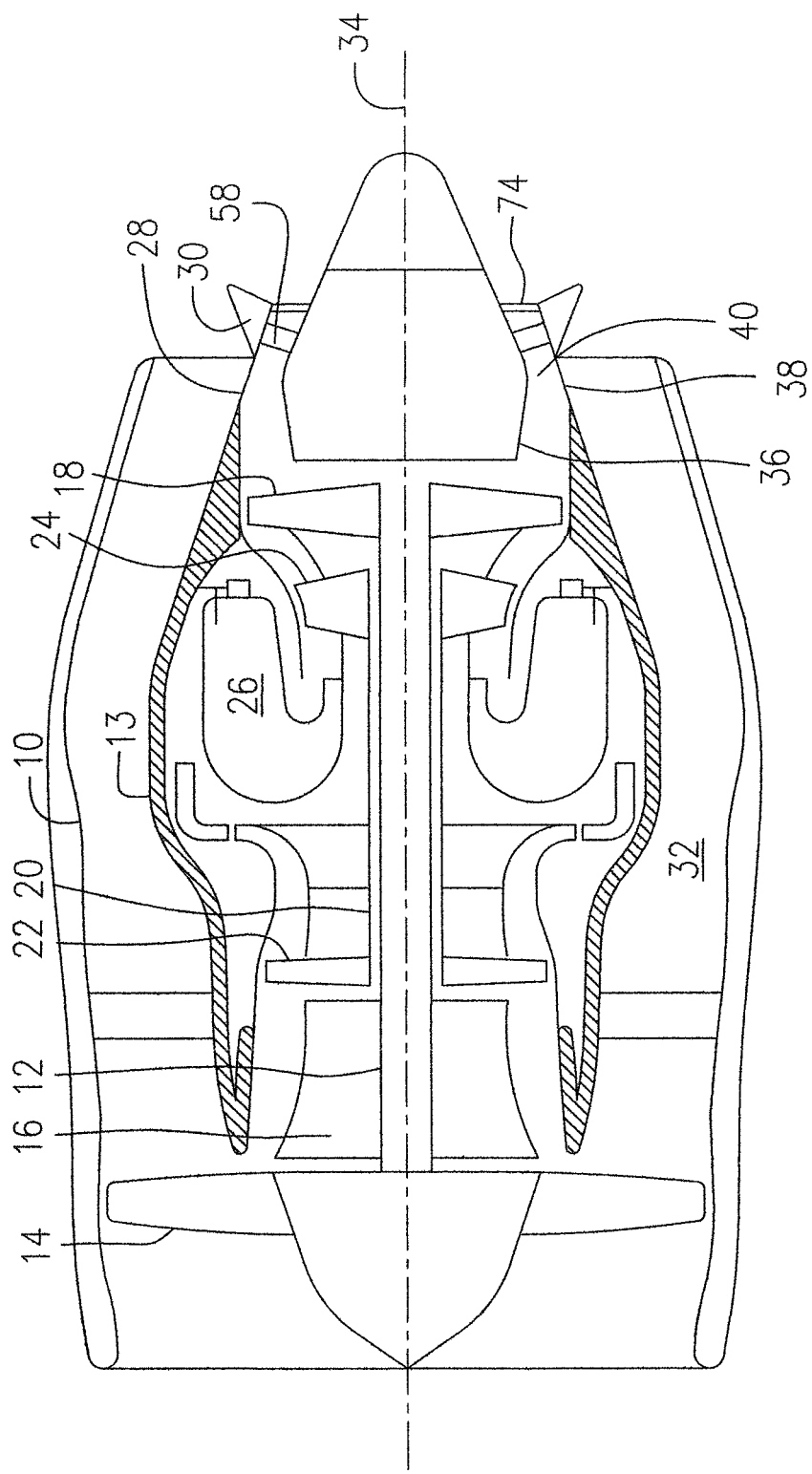
FIG. 1 is a schematic side cross-sectional view of an exemplary turbofan aeroengine showing an application of the described subject matter according to one embodiment.

FIG. 1 illustrates an exemplary turbofan aeroengine which includes a nacelle configuration 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not numbered) therethrough. In the main fluid path there is provided a combustion chamber 26 in which a combustion process produces combustion gases to power the high and low turbine pressure assemblies 24 and 18. A turbine exhaust case (TEC) 28 is provided to form a downstream end of the core casing 13 and a mixer 30 is attached to the downstream end of the TEC 28 for mixing hot exhaust gases discharged from the high and low pressure turbine assemblies 24, 18 through the main fluid path, with a bypass airstream driven by the fan assembly 14 through an annular bypass duct 32 which is defined radially between the nacelle configuration 10 and the core casing 13.

Figure 2:
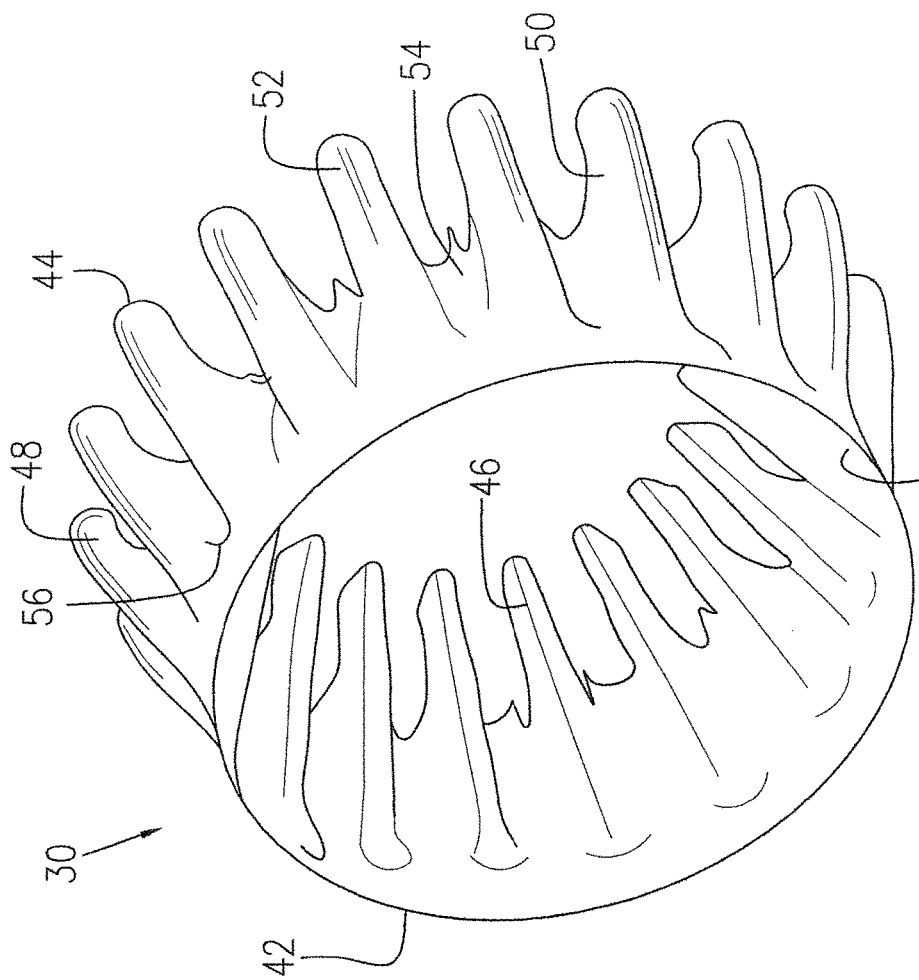
FIG. 2 is a perspective view of a turbine exhaust case mixer according to one embodiment which may be used in the engine of FIG. 1.
Figure 3:
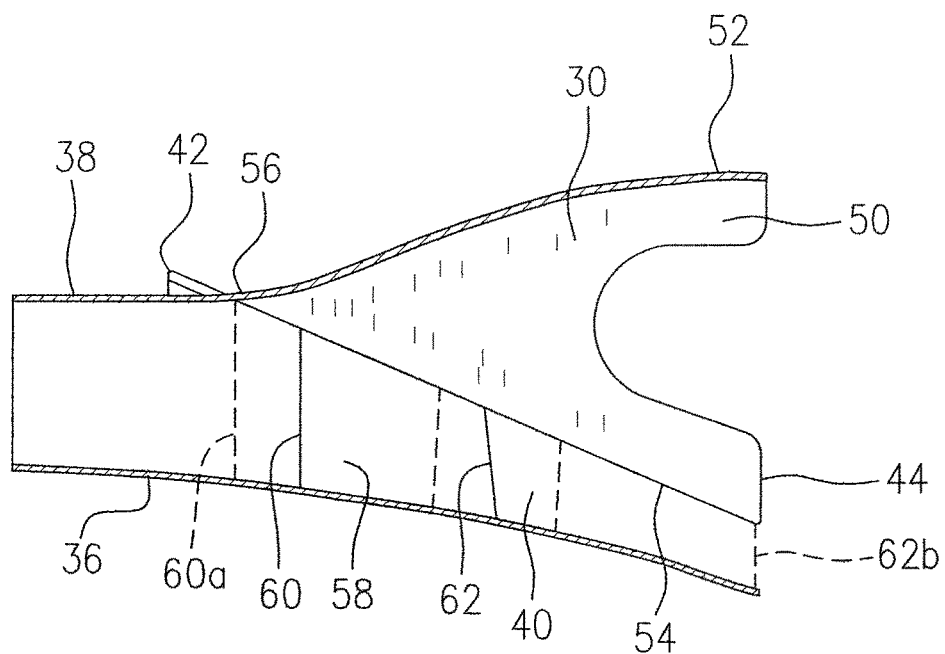
FIG. 3 is a partial cross-sectional view of the engine of FIG. 1, showing another embodiment of the mixer integrated with deswirling struts in an enlarged scale.
Figure 4:
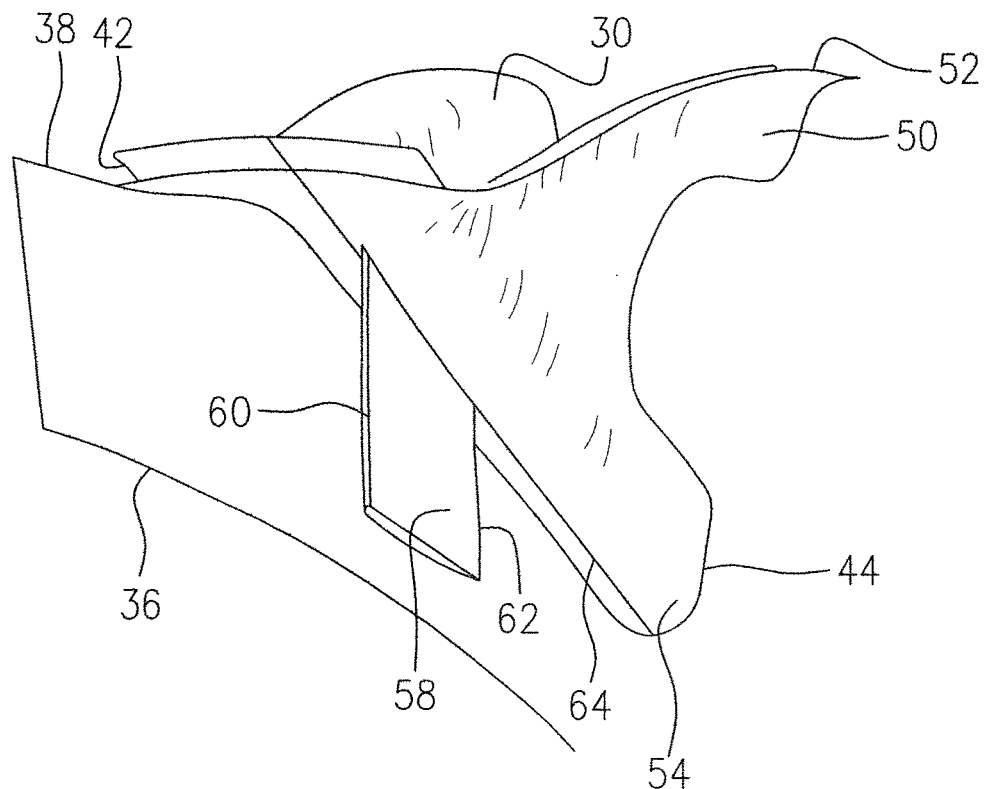
FIG. 4 is a perspective view of the mixer incorporated with the deswirling strut of FIG. 3, with the deswirling strut partially cut away to show a cross-section thereof.

Referring to FIGS. 1-3, the TEC 28 and the mixer 30 define a common central axis 34 which substantially superposes a central rotation axis of the aeroengine. The TEC 28 includes an annular hub 36 and an annular shroud 38 with the annular mixer 30 attached to a downstream end of the shroud 38. The shroud 38 and the mixer 30 surround the hub 36 to form an annular exhaust gas duct 40 disposed radially therebetween.

It should be noted that the terms "upstream" and "downstream" used herein and hereinafter refer to the direction of a fluid flow passing through the main fluid path of the engine. It should also be noted that the terms "axial", "radial" and "circumferential" are used with respect to the central axis 34.

The mixer 30 according to one embodiment such as shown in FIG. 2, may define an annular wavy configuration around the central axis 34 and may axially extend between an upstream end 42 and a downstream end 44 thereof. The mixer 30 may include inner and outer circumferential flow surfaces 46, 48 extending between the upstream and downstream ends 42, 44 of the mixer 30. The inner and outer flow surfaces 46, 48 may be in a circumferentially wavy or twisted annular configuration to thereby form a plurality of lobes 50 of the mixer 30. The lobes 50 may be axially extending or axially straight and may define a plurality of alternating crests 52 and valleys 54. In a cross-sectional view as shown in FIG. 3, adjacent crest 52 and valley 54 extend from an axial start point 56 which is close to the upstream end 42 (more clearly shown in FIG. 3) and diverging to the downstream end 44 of the mixer 30.

The inner surface 46 may define inner passageways (not numbered) axially and radially-outwardly along the respective crests 52 for directing the exhaust gases flowing through the annular exhaust gas duct 40. The outer flow surface 48 may define external passageways (not numbered) axially and radially-inwardly along the respective valleys 54 for directing the bypass airstream coming through the annular bypass air duct 32 to flow through the mixer 30. Therefore, the internal and external passageways of the mixer 30 may in combination establish a vortex system downstream of the mixer 30 to encourage mixing between the bypass airstream and the turbine exhaust gases during operation of the aeroengine.

Referring to FIGS. 1 and 3-5, the mixer 30 according to one embodiment may include a plurality of deswirling struts 58 circumferentially spaced apart with respect to the central axis 34, and integrated with the mixer. The deswirling struts 58 may be disposed within an axial length of the mixer 30, between the upstream end 42 and the downstream end 44 of the mixer 30. The deswirling struts 58 may extend radially across the annular exhaust gas duct 40 and may interconnect the mixer 30 and the hub 36 of the TEC 28.

The deswirling struts 58 each include a leading edge 60 and a trailing edge 62. The trailing edge 62 of each deswirling strut 58 according to one embodiment may circumferentially align with a bottom of the valley 54 such as a bottom line 64 (see FIG. 4) which is a center line of the valley 54. The deswirling struts 58 according to one embodiment may be axially located in a middle area of the mixer 30 such that the leading edges 60 of the respective deswirling struts 58 are axially spaced away from the starting point 56 of the divergently extending crests 52 and valleys 54 and such that the trailing edges 62 of the respective deswirling struts 58 are axially spaced away from a downstream end of the respective valleys 54 of the mixer 30. The downstream end of the respective valleys 54 according to this embodiment are the downstream end 44 of the mixer 30 because the crests 52 and valleys 54 have a substantially equal axial length as shown in FIG. 3. However, if the axial length of the valleys 54 is less than the axial length of the crests 52, such as illustrated in the embodiment shown in FIG. 2, the downstream end of the valleys 54 will not be the downstream end of the mixer 30.

Figure 5:
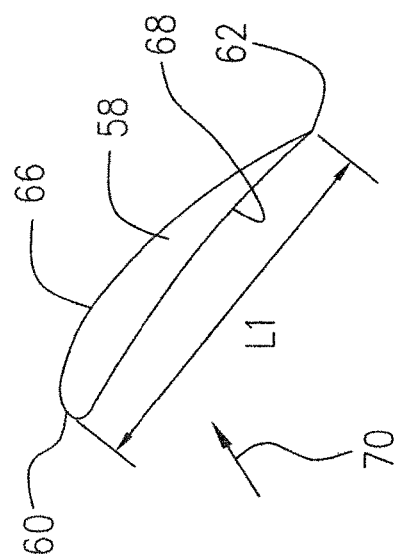
FIG. 5 is a cross-sectional view of the deswirling strut to show the cross-section of the deswirling strut in FIG. 4 having an airfoil profile.

Optionally, the deswirling struts 58 may each have a cambered profile, for example including a convex side 66 and a concave side 68 extending between the leading and trailing edges 60 and 62 as shown in the cross-sectional view of the deswirling strut 58 in FIG. 5. The struts 58 are cambered in the direction of an incoming swirling flow of the exhaust gases, as indicated by arrow 70 in FIG. 5.

According to one embodiment the deswirling of the swirling flow 70 of the exhaust gases discharged from the low pressure turbine assembly 38 and passing through the annular exhaust gas duct 40, may be accomplished within the mixer 30 by both the deswirling struts 58 and the mixer lobes 50. The swirling flow 70 of exhaust gases passing through the annular exhaust gas duct 40 near the hub 36 may be deswirled by the deswirling struts 58. The swirling flow 70 of the exhaust gases passing through the annular exhaust gas duct 40 near the shroud 38 may be deswirled by the lobes 50 of the mixer 30. With the configuration as described in the above embodiments, the deswirling and mixing functions may be accomplished within a much shorter axial length of the TEC and mixer in contrast to conventional TEC and mixer configurations, thereby advantageously saving engine and nacelle weight. The configuration of the above-described embodiments, can deswirl the swirling flow of exhaust gases and mix the exhaust gases with the bypass air stream with a performance equivalent to or better than that of conventional separate mixer and TEC struts.

The size, shape and position of the deswirling struts may be optimized based on the application and are dependent on the flow conditions including the residual swirl condition from the low pressure turbine assembly 18. The deswirling struts according to the described embodiments may be incorporated into any conventional TEC mixer when the swirl in the exhausted gases is required to be removed. For example, some of the described embodiments may be applicable to TEC mixers in which the axial length of the valleys of the mixers are longer than the axial length of the crests of the mixers.

Alternatively, the deswirling struts 58 may be axially located within the mixer 30 such that the leading edge 60 of each of the deswirling struts 58 axially aligns with the start point 56 of the divergently extending crests 52 and valleys 54, as shown by broken line 60a in FIG. 3. Also alternatively, the deswirling struts 58 may be axially located within the mixer 30 such that the trailing edge 62 of each of the deswirling struts 58 axially aligns with the downstream end of the respective valleys 54, as indicated by broken line 62b in FIG. 3.

Optionally, each of the valleys 54 of the mixer 30 may be connected with one of the deswirling struts. Also optionally, every second one of the valleys 54 of the mixer 30 may be connected with one of the deswirling struts. Furthermore, the deswirling struts may be circumferentially located at other intervals of the valleys 54 of the mixer 30.

Figure 6:
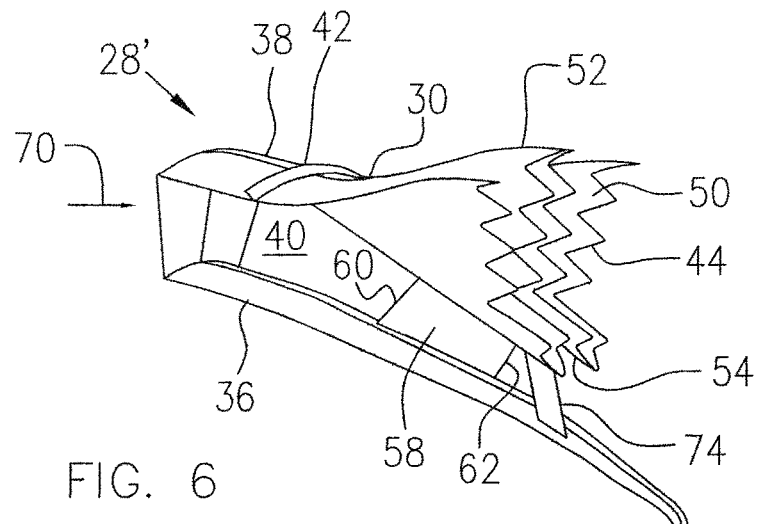
FIG. 6 is a side and rear perspective view of a circumferential section of a turbine exhaust case and a mixer integrated with deswirling struts and secondary struts according to another embodiment.
Figure 7:
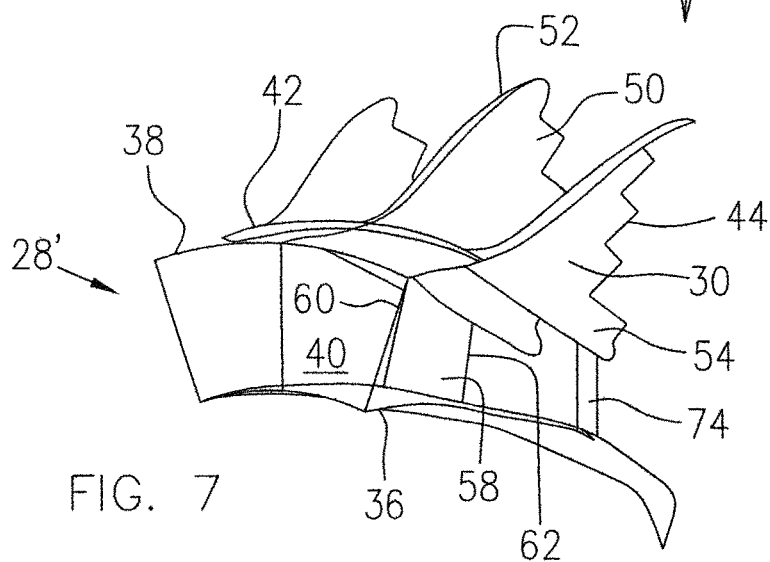
FIG. 7 is a side and front perspective view the circumferential section of the turbine exhaust case and mixer integrated with the deswirling struts and the secondary struts of FIG. 6.
Figure 8:
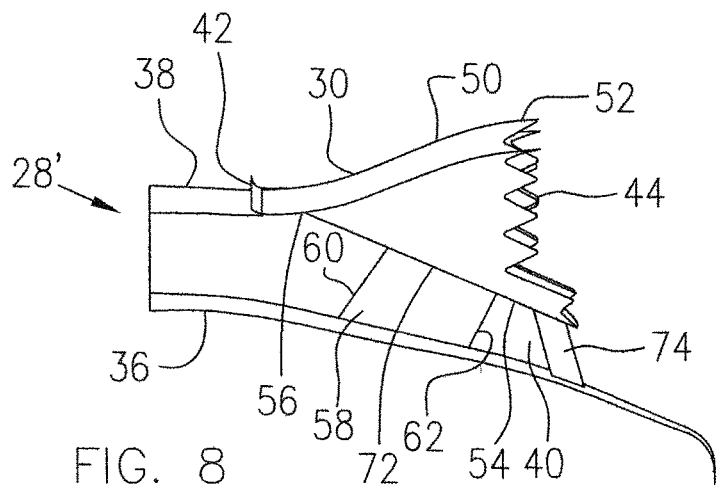
FIG. 8 is side perspective view of the circumferential section of the turbine exhaust case and the mixer integrated with the deswirling struts and secondary struts of FIG. 6.

Referring to another embodiment as shown in FIGS. 6-9B, a TEC 28' (only a circumferential section thereof is shown in the drawings FIG. 6-8), similar to the TEC 28 as described with reference to FIGS. 1-5, includes the inner annular hub 36, the annular shroud 38 with the mixer 30. Like features are indicated by like reference numerals and will not be redundantly described. The further description of the TEC 28' will be focussed on the difference between this embodiment and the TEC 28 as described with reference to FIGS. 1-5.

The radial deswirling struts 58 extending radially across the annular exhaust gas duct 40 to interconnect the mixer 30 and the annular hub 36, are fewer in number than the number of the lobes 50 or the number of the valleys 54 of the mixer 30, and therefore, the respective deswirling struts 58 may be connected to only a first selected group of the valleys 54, not to all the valleys of the mixer 30. A plurality of secondary trailing edge struts 74 may be provided in the TEC 28' radially extending across the annular gas duct 40 to interconnect the mixer 30 and the annular hub 36. The secondary struts 74 are fewer in number than the number of the lobes 50 or the number of the valleys 54 of the mixer 30, and may be connected to a second selected group of the valleys 54 which are free of connection with the deswirling struts 58. The secondary struts 74 may be axially located immediately upstream of a trailing edge (not numbered) of the respective valleys 54 of the selected second group. A chord length of a strut may vary radially, however, the secondary struts 74 and may each have an average chord length L2 (see FIG. 9A) shorter than the average chord length L1 of the respective deswirling struts 58 (see FIG. 5). Therefore, the overall secondary strut size is smaller than the overall deswirling strut size, regardless of the radial variation of the chord.

Similar to the previously described embodiment, the deswirling struts 58 may each have a cambered profile, for example being cambered in a direction of an incoming swirling flow 70 of the exhaust gases, as shown in FIG. 5. The smaller secondary struts 74 may each have an airfoil profile (see FIG. 9A) with or without a chambered shape. Alternatively, the smaller secondary struts 74a may each be formed by a flat plate (see FIG. 9B). The smaller secondary struts 74, 74a, regardless of the shape options thereof, may be placed in an orientation similar to the orientation of the deswirling struts 58 with respect to the incoming swirling flow 70 of the exhaust gases (see FIG. 5).

While the secondary struts 74 may be axially located immediately upstream of the trailing edges of the selected valleys 54 of the second group with which the secondary struts are connected, the deswirling struts 58 may be located in the middle of the mixer 30, and may be axially spaced away from the trailing edges of the selected valleys 54 of the first group with which the deswirling struts are connected. Optionally, the leading edges 60 of the respective deswirling struts 58 may be axially spaced away from the axial start point 56 (see FIG. 8) of the divergently extending crests 52 and valleys 54, and the trailing edges 62 of the respective deswirling struts 58 (as shown in FIG. 5) may be axially spaced away from the trailing edges of the respective selected valleys 54 of the first group with which the deswirling struts are connected. Optionally, the deswirling struts 58 may be axially located between an axial center point 72 (see FIG. 8) of the respective selected valleys 54 of the first group with which the respective deswirling struts are connected, and the axial start point 56 (see FIG. 8) of the divergently extending crests 52 and valleys 54, that is, the deswirling struts 58 may be located in an axial upstream half of the mixer.

In TEC 28' the deswirling struts 58 and the secondary struts 74 may be circumferentially distributed in various alternating patterns. For example, each of the deswirling struts 58 may be positioned between two circumferentially adjacent secondary struts 74. Optionally, each of the secondary struts 74 may be positioned between two circumferentially adjacent deswirling struts 58. Also optionally, the deswirling struts 58 and the secondary struts 74 may be circumferentially distributed in an alternating pattern of every one or more of the deswirling struts 58 and every one or more of the secondary struts 74.

The total number of the deswirling struts 58 and the secondary struts 74 of the mixer 30 may be equal to or less than the number of the lobes 50 or the number of the valleys 54 of the mixer 30.

The downstream end 44 of the TEC 28' may be formed in various shapes of trailing edges of the mixer 30, including trailing edges of the valleys 54 and trailing edges of the crests 52. For example, the downstream end 44 of the mixer 30 may form a jagged trailing edge (not numbered) as illustrated in FIGS. 6-8, which is described in U.S. Pat. No. 8,635,875 granted to Cunningham on Jan. 28, 2014 which is incorporated herein by reference.

The actual combination, such as the number of the integrated deswirling struts 58 and the secondary trailing edge struts 74 may vary and is dependent on various mixer performance requirements in particular engine designs such as pressure loss, mixing and residual nozzle swirl. The number of integrated deswirling struts 74 of the TEC 28' embodiment need not be equal to the number of mixer lobes 50 since the mixer 30 itself can partially deswirl the core flow in the TEC 28' without a significant increase in pressure losses. The region of the core flow near the central body (the annular hub 36) and below the mixer valleys 54, requires adequate deswirling of the exhaust gases to maximize thrust in the axial direction at the nozzle exit. This is accomplished by the secondary trailing edge struts 74 being positioned just upstream of the mixer valley trailing edges. Hence, the lower core flow between the central body and the mixer valleys 54 is deswirled by the integrated deswirling struts 58 and the secondary trailing edge struts 74 whereas the upper core flow between the valleys 54 and the mixer crests 52 is deswirled by the integrated deswirling struts 58 and the mixer 30 itself. The reduction in pressure loss due to fewer integrated deswirling struts 58 is partially offset by the increase in pressure loss on the mixer 30 (due to deswirling) and the secondary trailing edge struts 74 incorporation/ presence. Therefore, in the above-described TEC embodiments, the deswirling performance and mixing performance are effectively accomplished within a compact axial length of the mixer 30, thereby saving engine and nacelle weight. A manufacturing fillet (by either welding, casting, additive manufacturing, etc) between the mixer valley 54 and deswirling strut 58 as well as between the annular hub 36 and deswirling strut 58 can be present. A manufacturing fillet between the mixer valley 54 and secondary trailing edge strut 74 as well as between the annular hub 36 and secondary trailing edge strut 74 can be present.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A turbine exhaust case (TEC) of a turbofan aeroengine comprising a hub and a shroud with a mixer attached to a downstream end of the shroud for mixing exhaust gases with a bypass air stream, the hub and the shroud being annular, the mixer including a plurality of axially extending lobes of the mixer arranged in alternating crests and valleys extending divergently in a downstream direction, the mixer surrounding the hub to form an annular exhaust gas duct between the mixer and the hub, a plurality of deswirling struts extending generally radially across the annular exhaust gas duct axially within the mixer to connect the mixer and the hub, the deswirling struts fewer in number than a total number of the valleys of the mixer, a selected first group of the valleys of the mixer directly connected to the deswirling struts such that the first group of valleys contact the deswirling struts at an axial location between a start point where the valleys diverge from the crests and a trailing edge of the valleys, a plurality of secondary struts having an average chord length shorter than an average chord length of the respective deswirling struts, the secondary struts generally radially extending across the annular exhaust gas duct and connected to the hub, a selected second group of the valleys distinct from the first group of the valleys directly connected to the secondary struts such that the secondary struts contact said second group of the valleys immediately upstream of a trailing edge of said valleys, the deswirling struts spaced from the selected second group of the valleys.

2. The TEC as defined in claim 1 wherein the deswirling struts comprise a cambered profile, the cambered profile being cambered in a direction of an incoming swirling flow of the exhaust gases.

3. The TEC as defined in claim 1 wherein the deswirling struts are axially spaced away from the trailing edges of the respective valleys of the selected first group of the valleys of the mixer.

4. The TEC as defined in claim 1 wherein the deswirling struts are axially located in an axial upstream half of the mixer.

5. The TEC as defined in claim 1 wherein the secondary struts comprise an airfoil profile.

6. The TEC as defined in claim 1 wherein the secondary struts comprise a flat plate.

7. The TEC as defined in claim 1 wherein a total number of the deswirling struts and the secondary struts is less than the total number of the valleys of the mixer.

8. A turbofan aeroengine comprising a turbine exhaust case (TEC) positioned downstream of a turbine section of the turbofan aeroengine for directing a flow of gases exhausted from the turbine section, the TEC including an inner annular hub surrounded by an annular outer wall, a downstream end section of the annular outer wall being in a circumferential wavy configuration to form a plurality of axially extending ions defining alternating crests and valleys extending divergently to a downstream end of the TEC, the crests defining internal axial and radially-outward passages for directing gases exiting from the turbine section to pass through the TEC, and the valleys defining external axial and radially-inward passages for directing a bypass air stream to pass along an external surface of the TEC, resulting in mixing of the oases with the bypass air stream, a number of circumferentially spaced deswirling struts having a cambered profile and being located within an axial length of the circumferential wavy configuration, the number of the deswirling struts being less than a total number of the valleys of the mixer, the deswirling struts radially interconnecting the inner annular nub and a first selected group of the valleys number of secondary struts having an average chord length shorter than the average chord length of the respective deswirling struts, the secondary struts radially interconnecting the inner annular hub and a selected second group of the valleys distinct from the first group of the valleys, the deswirling struts spaced from the selected second group of the valleys, the selected first group of the valleys of the mixer directly connected to the deswirling struts such that the first group of valleys contact the deswirling struts at an axial location between a start point where the valleys diverge from the crests and a trailing edge of the valleys, the selected second group of the valleys directly connected to the secondary struts such that secondary struts contact the second group of the valleys immediately upstream of a trailing edge of said valleys.

9. The turbofan aeroengine as defined in claim 8 wherein the deswirling struts comprise a leading edge and a trailing edge, the leading edges of the deswirling struts being axially spaced away from a start point of the divergently extending crests and valleys, and the trailing edges of the deswirling struts being axially spaced away from the trailing edges of the respective valleys of the selected first group of the valleys.

10. The turbofan aeroengine as defined in claim 8 wherein the deswirling struts and the secondary struts are circumferentially distributed such that each of the deswirling struts is positioned between adjacent two of the secondary struts.

11. The turbofan aeroengine as defined in claim 8 wherein the deswirling struts and the secondary struts are circumferentially distributed such that each of the secondary struts is positioned between adjacent two of the deswirling struts.

12. The turbofan aeroengine as defined in claim 8 wherein the deswirling struts and the secondary struts are circumferentially distributed in an alternating pattern of every one or more of the deswirling struts and every one or more of the secondary struts.

13. The turbofan aeroengine as defined in claim 8 wherein a total number of the deswirling struts and the secondary struts is equal to the total number of the valleys.

14. The turbofan aeroengine as defined in claim 8 wherein a total number of the deswirling struts and the secondary struts is less than the total number of the valleys.

15. The turbofan aeroengine as defined in claim 8 wherein the downstream end of the TEC comprises a jagged trailing edge.

16. The turbofan aeroengine as defined in claim 8 wherein the secondary struts comprise an airfoil profile.

17. The turbofan aeroengine as defined in claim 8 wherein the secondary struts comprise a flat plate.

* * * * *